United States Patent Office 3,125,364
Patented Mar. 17, 1964

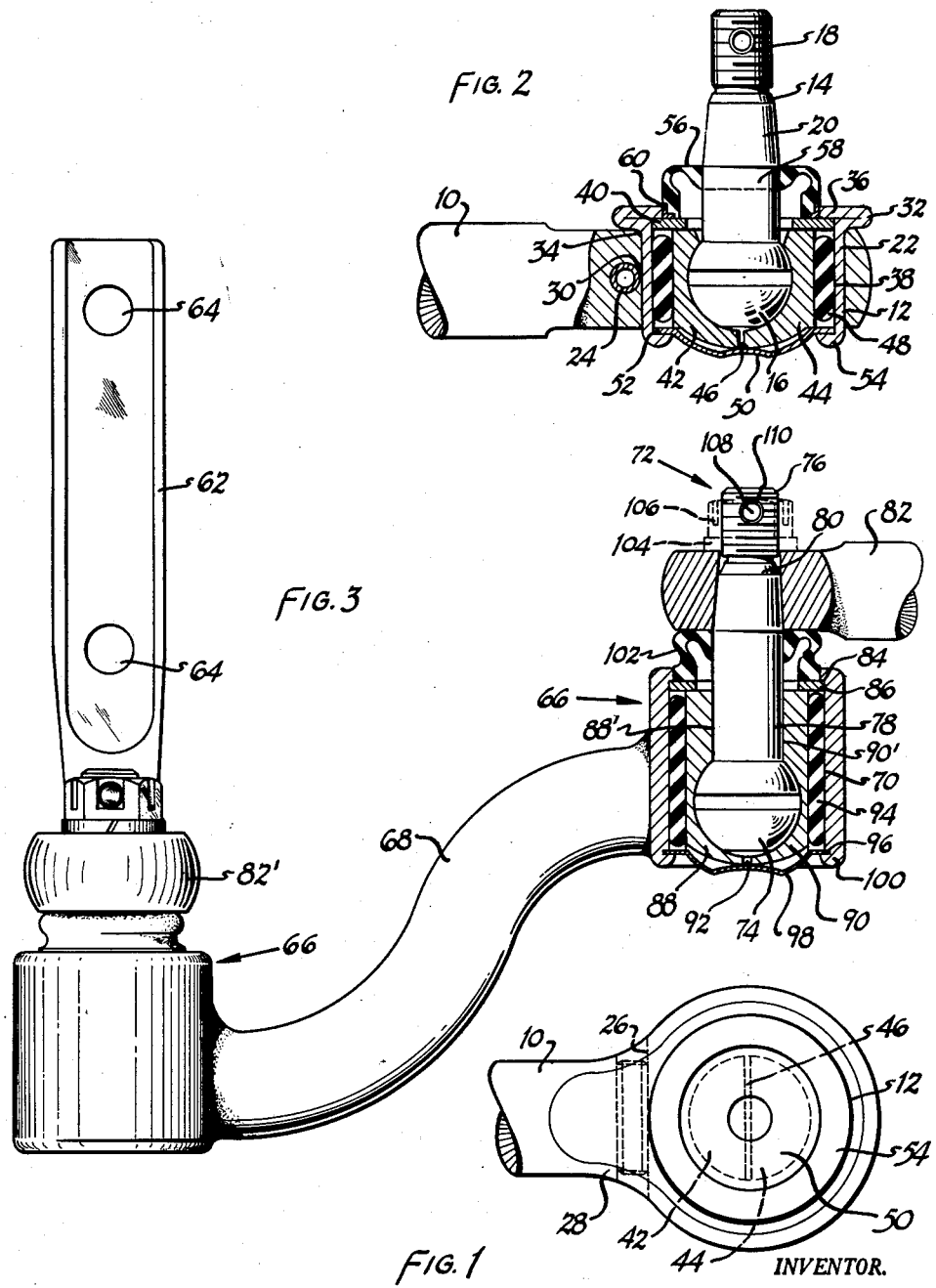

3,125,364
BALL AND SOCKET JOINT
Raymond W. Springer, 33505 Michele Ave.,
Livonia, Mich.
Filed Apr. 12, 1961, Ser. No. 102,425
2 Claims. (Cl. 287—90)

This invention relates to ball and socket joints for connecting rod and arm members through which force is transmitted, and more particularly to a simplified joint having improved operating characteristics, and which may be fabricated economically.

This application is a continuation-in-part of my co-pending application, Serial No. 740,429, filed June 6, 1958, and now abandoned.

Ball and socket connectors are widely used in vehicles, for example in the steering linkages and in wheel suspensions. While such connectors have wide application in industry I have illustrated my invention as applied to an automobile steering assembly.

More specifically, in one aspect, the ball and socket joint is illustrated as being applied to the connection of a pitman rod to an idler arm of an automobile steering assembly to provide pivotal rotary movement; and in a second aspect, a modification of the ball and socket joint is illustrated as being applied to the third arm of an automobile steering assembly where planar rotary movement rather than pivotal movement is provided.

An object of my invention is to provide an improved ball and socket joint of the self-lubricating type having resiliently actuated wear compensating means.

A further object of my invention resides in the provision of a rugged and strong ball and socket joint construction which can be economically fabricated.

Another object of my invention is to provide a shock resistant ball and socket joint wherein a cylindrical resilient member is employed to yieldingly urge split bearing members into engagement with a ball positioned within the bearing members.

A still further object of my invention is to provide a wear compensating resiliently mounted self-lubricating ball and socket joint which may be securely sealed at opposite ends.

An additional object of the present invention is to provide a novel ball and socket joint which provides pivotal and rotary movement.

A further additional object of the present invention is to provide a novel ball and socket joint which provides planar rotary movement.

Other objects and advantages of my invention will be apparent from the following detailed description considered in conjunction with the accompanying drawings submitted for the purposes of illustration only and not intended to define the scope of the invention, reference being had for that purpose to the subjoined claims.

In the drawings wherein similar reference characters refer to similar parts throughout the several views:

FIG. 1 is a longitudinal sectional view of a ball and socket joint connector embodying my invention;

FIG. 2 is an elevational view taken substantially on the line 2—2 of FIG. 1, looking in the direction of the arrows; and FIG. 3 is a side elevational view, partly in section, of a second embodiment of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to the drawings it will be noted that a first embodiment of my improved ball and socket joint is illustrated as embodied in a rod 10 having a cylindrical opening or eye 12. A ball stud 14 having a ball end 16 and a threaded end 18 has interposed therebetween a tapered section 20 adapted to be clampingly engaged by an arm or other member to be connected to the rod 10 in force transmitting relation.

A bushing 22 is fitted in the cylindrical opening 12 in the rod 10. The bushing is preferably dimensioned to be a press fit with the eye 12 of the rod 10, and may be secured in place therein by a pin 24 projecting through a hole 26 extending transversely through the flared section 28 of the rod 10 adjacent and perpendicular to the longitudinal axis of the cylindrical opening 12 to engage the edge 30 of the bushing 22 and exert a clamping force thereon.

One end of the bushing 22 is contoured to provide a radially outwardly extending flange 32 to engage the side 34 of the rod 10 adjacent one end of the cylindrical opening 12 to locate the bushing 22 and the ball joint within the eye 12. The contoured end of the bushing 22 is folded back on itself to provide an inturned flange 36 extending radially inside of the inner surface 38 of the bushing 22.

A washer 40 is positioned within the bushing 22 with its outer periphery engaging the inturned flange 36 of the bushing 22. The shank and tapered section 20 of the ball stud 14 project through the washer 40.

Longitudinally split cooperating bearing members 42 and 44 embrace the ball end 16 of the ball stud 14 and at their inner ends engage the washer 40 to locate the ball 16 in the cylindrical opening 12 of the rod 10. The bearing members 42 and 44 do not completely close around the ball 16 but are proportioned to provide a clearance space 46 through which the bearing members may move toward each other to compensate for wear of the contacting surfaces of the bearing members 42 and 44 and the ball 16. The bearing members 42 and 44 may be formed of the so-called self-lubricating materials such as "Oilite" bearings or they may be formed of nylon, pressed graphite or other suitable material having the desired properties.

A resilient liner member 48 is interposed between the bearing members 42 and 44 and the inner surface 38 of the bushing 22 to cushion shock imparted from the rod 10 to the ball stud 14 or vice versa.

The resilient liner 48 is of tubular configuration and has substantially parallel and straight cylindrical inner and outer surfaces. The resilient liner 48 also exerts a compressive force on the bearing members 42 and 44 which maintains the surfaces of the bearing members in firm engagement with the external surface of the ball 16. The resilient liner 48 may be formed of rubber, neoprene or other suitable material capable of absorbing shock and maintaining a compressive force on the bearing members 42 and 44.

The outer end of the assembly is closed by a cap 50 engaging an internal flange 52 formed in the other end of the bushing 22 and overlying the bearing members 42 and 44 and the resilient liner 48. The cap 50 is secured in place by spinning the outer end of the bushing 22 over the outer periphery of the cap as illustrated at 54.

The opposite end of the assembly may be sealed by a resilient boot 56 engaging the shank portion 58 of the ball stud 14. The outer end of the boot 56 is preferably secured as by welding or cementing to a retaining ring 60 pressed into the inturned flange 36 of the bushing 22 to seal the inner end of the assembly.

Function of the First Embodiment

Obviously the important function of the first embodiment of the ball and socket joint of the present invention is to provide a shock-absorbing, force-transmitting connection between two movable arms or rods. However, it will be noted by reference to FIG. 1 that the force-transmitting connection provides two types of movement; thus pivotal movement between the arms connected by the joint is provided. This is effected by virtue of the fact that the tapered section 20 of the ball stud 14 is free to pivot to and fro in the bearing members 42 and 44 to the limits of contact with said bearing members. Additionally, by virtue of the fact that the ball 16 is round, and is retained in position by self-lubricating bearing members 42 and 44, it is free to rotate in said bearing members and therefore provide rotary movement. Thus a joint which gives both rotary and pivotal movement is provided.

An alternate embodiment of the ball and socket joint of the present invention is shown in FIG. 3 and this embodiment is distinguishable from the embodiment of FIGS. 1 and 2 in that it provides only planar rotary movement in contrast to the pivotal rotary movement provided by the embodiment of FIGS. 1 and 2.

It should be noted again that the embodiment of FIGS. 1 and 2 can be applied, for example, to a tie-rod end of an automobile steering assembly where vertical movement of the front wheel of the automobile requires both pivotal and rotary movement of the ball joint. However, the embodiment of FIG. 3 is shown as applied to the center or third arm of a steering assembly wherein rectilinear movement only is desired.

As shown in FIG. 3, a bracket 62 is secured as by rivets 64 to a body frame cross member (not shown). The bracket 62 has a ball and socket assembly 66 formed thereon of the second embodiment of the invention. This assembly 66 is identical to the assembly 66 shown in section in the right hand portion of FIG. 3; accordingly, only a description of the right hand portion of FIG. 3 will be given for illustrating the second embodiment of the invention. Thus, as shown in FIG. 3 the improved ball and socket joint is illustrated as embodied in a rod 68 forming a part of an automobile steering mechanism. The rod is provided at its end with a cylindrical opening or eye 70. A ball stud 72 having a ball end 74 and a threaded end 76 has interposed therebetween an elongated cylindrical rod portion 78 and a tapered section 80 adapted to be clampingly engaged by an arm 82 or other member to be connected to the rod 68 in force-transmitting relation. The opening 70 is provided with an inwardly extending shoulder 84 and a retaining washer 86 is positioned against the shoulder with its outer periphery engaging the inner periphery of the opening 70. The cylindrical portion 78 of the ball stud 72 projects through the washer 86.

Longitudinally split cooperating bearing members 88 and 90 embrace the ball end 74 of the ball stud 72 and at their top ends engage the washer 86 to locate the ball 74 in the cylindrical opening 70 of the rod 68. As described for the FIGS. 1 and 2 embodiment, the bearing members 88 and 90 do not completely close around the ball 74, but are proportioned to provide a clearance space 92 through which the bearing members 88 and 90 may move toward each other to compensate for wear of the contacting surfaces of the bearing members and the ball 74. The bearing members are suitably formed of self-lubricating materials such as "Oilite" material, nylon or the like as described for the FIG. 1 embodiment.

In this embodiment of the invention it will be noted that the bearing members 88 and 90 have cylindrical portions 88' and 90' embracing the cylindrical portion 78 of the ball stud 72. This prevents the ball stud 72 from rocking in a pivotal motion and provides only for planar rotary motion, in contrast to the embodiment of FIG. 1. A resilient bushing or liner member 94 is interposed between the outside surface of the bearing members 88 and 90 and the inner surface of the opening 70 to cushion the shock imparted from the rod 82 to the ball stud 72 or vice versa. The resilient liner 94 also exerts a compressive force on the bearing members 88 and 90 to maintain the bearing surfaces of such bearing members in firm engagement with the external surface of the ball 74 and the cylindrical portion 78 of the ball stud 72. The resilient liner 94 is formed of rubber or the like as in the FIGS. 1 and 2 embodiment, and is also formed in tubular configuration with substantially parallel and straight cylindrical inner and outer surfaces.

The opening 70 is provided with an outwardly extending shoulder 96 against which a cap 98 is pressed to overlie the bearing members 88 and 90 in sealing relationship. The cap 98 is secured in place by spinning the bottom end of the opening 70 inwardly and over the outer periphery of the cap as illustrated at 100. Thus the liner 94, the ball and cylindrical portions 74 and 78 of the ball stud 72 and the bearing members 88 and 90 along with the retaining washer 86 are retained in the opening 70 of arm 68 in operable relationship with each other.

Before the arm 82 is applied to the tapered portion 80 of the ball stud 72 a resilient annular boot 102 is fastened at one end against the outer surface of the washer 86 and the other end snugly engages the cylindrical portion 78 of the stud 72 just beneath the arm 82. This provides a seal which prevents entrance of undesirable foreign matter such as water and dirt into the assembly. The arm 82 is secured in place by a lock washer 104 and a bolt 106 with a pin 108 inserted through a suitable aperture 110 in the threaded portion 76 of the ball stud 72.

Function of the Second Embodiment

Obviously the important function of the second embodiment of the ball and socket joint of the present invention is to provide a shock absorbing, force-transmitting connection between two movable arms or rods. However, it will be noted by reference to FIG. 3 that the cylindrical portion 78 of the stud 72 is retained within cylindrical portions 88' and 90' of the bearing members 88 and 90. Thus it will be seen that the ball stud 72 is prevented from pivotal movement and is limited to simple rotary movement. Thus it will be seen that the arm 82 of the right hand ball and socket joint of FIG. 3 will be limited to a parallel motion with respect to arm 82' of the left hand ball and socket joint 66 of FIG. 3. Thus, planar pivotal movement will be imparted to a rod member 82.

Advantages of the Ball and Socket Joint of the Present Invention

From the foregoing, it will be evident that the ball and socket joint of the present invention is of simplified construction and is effectively sealed against the entrance of foreign matter thereinto to provide long and trouble free life. Further, the ball and socket joint is characterized by an ability to absorb shocks and stresses imparted to either one or the other of the arms which it connects. Still further, the improved ball and socket joint of the present invention is characterized by being self-compensating with respect to wear by virtue of the resilient liner which expands as the bearing members surrounding the ball stud contained therein wear during use. Further, by virtue of the fact that the bearing units comprised in the ball and socket joint are of the self-lubricating variety, a maintenance free assembly is provided.

While my invention has been described with particular reference to a preferred embodiment it will be apparent that many changes may be made in the specific construction illustrated without departing from the spirit of my invention as defined in the following claims.

I claim:

1. In a ball and socket joint, the combination with a rod having a cylindrical opening, an inwardly directed flange adjacent one end of the cylindrical opening, an annular washer positioned within the cylindrical opening and engaging said flange, a thrust transmitting ball positioned within the cylindrical opening and having an elongated cylindrical shank projecting through the washer, longitudinally split bearing members having semi-spherical surfaces engaging the ball and mating cylindrical surfaces engaging said elongated cylindrical shank, said bearing members having substantially straight outer cylindrical surfaces, a resilient member surrounding said bearing members in separating relation between the bearing members and the cylindrical opening, and means to seal opposite ends of the ball and socket joint.

2. In a ball and socket joint comprising a rod having a cylindrical opening therein, said opening having a first inwardly extending shoulder adjacent one end thereof, a washer positioned within the cylindrical opening and engaging said first shoulder, a thrust transmitting ball positioned within the cylindrical opening and having a cylindrical shank portion extending through said washer, longitudinally split self-lubricating bearing members having semi-spherical inner surfaces engaging said ball and cylindrical portions engaging said cylindrical shank, and having substantially straight cylindrical outer surfaces, a resilient cylindrical bushing having substantially concentric inner and outer straight cylindrical surfaces interposed between said bearing members and said cylindrical opening, a second outwardly extending shoulder adjacent the other end of said cylindrical opening, a cap engaged against said second shoulder to close one end of the ball and socket joint, and a flexible seal engaging said washer, said first shoulder and said cylindrical shank extended beyond said washer to close the other end of the ball and socket joint.

References Cited in the file of this patent

UNITED STATES PATENTS

| | | |
|---|---|---|
| 1,923,601 | Weaver | Aug. 22, 1933 |
| 2,288,160 | Flumerfelt | June 30, 1942 |
| 2,309,249 | Karp | Jan. 26, 1943 |
| 2,488,979 | Kogstrom | Nov. 22, 1949 |
| 2,827,303 | Herbenar | Mar. 18, 1958 |

FOREIGN PATENTS

| | | |
|---|---|---|
| 513,810 | Canada | June 14, 1955 |